United States Patent [19]
Asai

[11] Patent Number: 5,720,994
[45] Date of Patent: Feb. 24, 1998

[54] MOLD FOR MOLDING DISCS TO BE LAMINATED INTO DOUBLE DISCS

[75] Inventor: Ikuo Asai, Nagoya, Japan

[73] Assignee: Meiki Co., Ltd., Ohbu, Japan

[21] Appl. No.: 624,769

[22] Filed: Mar. 27, 1996

[30] Foreign Application Priority Data

Oct. 9, 1995 [JP] Japan ................................. 7-287816
Nov. 27, 1995 [JP] Japan ................................. 7-332601

[51] Int. Cl.⁶ ........................................ B29C 45/00
[52] U.S. Cl. ..................... 425/556; 264/1.33; 264/106; 425/437; 425/589; 425/810
[58] Field of Search ........................... 425/810, 556, 425/437, 589; 264/1.33, 106, 107, 335

[56] References Cited

U.S. PATENT DOCUMENTS

| | | |
|---|---|---|
| 4,772,196 | 9/1988 | Asai. |
| 4,795,127 | 1/1989 | Asai. |
| 4,979,891 | 12/1990 | Kitamura ........................... 925/437 |
| 5,006,058 | 4/1991 | Maruyawa et al. ............... 425/556 |
| 5,297,951 | 3/1994 | Asai ..................................... 425/556 |
| 5,316,466 | 5/1994 | Janaka et al. ...................... 425/422 |
| 5,326,240 | 7/1994 | Kudo et al. ............................ 425/3 |
| 5,441,399 | 8/1995 | Campbell et al. ................. 425/556 |

FOREIGN PATENT DOCUMENTS 524332 3/1993 Japan.

*Primary Examiner*—Jay H. Woo
*Assistant Examiner*—Iurie A. Sohwartz
*Attorney, Agent, or Firm*—Browdy and Neimark

[57] ABSTRACT

A mold is for molding DVD discs to be joined together, back-to-back, to make a single disc. The mold includes a movable moldhalf and a stationary moldhalf. On one of the half-molds an inserting block extends a small distance into the mold cavity, so that the central part of the cavity is thinner than the outer part. The inner part and the outer part correspond approximately to the outer information band and the inner portion of the disc which is grasped. The mold is preferably used in a method using first a lower compression force during resin injection and then an increased force.

12 Claims, 8 Drawing Sheets

MOLD FOR MOLDING DISCS TO BE LAMINATED INTO DOUBLE DISCS

BACKGROUND OF THE INVENTION

1. Field of the Invention

The invention relates generally to a mold for molding digital video discs (all hereinafter described as DVD) made by laminating two discs together. More particularly, it concerns an improved use of the mold disclosed in Japanese opened utility patent Application Heisei 5-24332.

2. Description of the Related Art

To clearly read out information from the pits formed on compact discs, molded discs of the Direct Read After Writing (DRAW) type, and so on, it is required that the molded discs have excellent optical properties and particularly that the value of birefringence is within a predetermined value range.

The prior art discloses many improvements relating to the birefringence of optical discs in the field of injection molding.

The inventor's Japanese opened utility patent Application Heisei 5-24332 is among this prior art. It discloses a mold as follows:

The mold has a stationary mold half with a stationary mirror plate in which a gate insert bushing for holding a sprue bushing is inserted in the central portion. It also has a movable mold half with a movable mirror plate which includes an inner peripheral stamper retainer for retaining a stamper along an inner periphery thereof. To make the flow behavior of the resin injected into a mold cavity change and to make birefringence of the molded discs improve, each tip surface of the gate insert bushing and the inner stamper retainer protrudes slightly from the surface of the stationary mirror plate and the movable mirror plate respectively. The tip portion surfaces of the gate insert bushing and the inner stamper retainer protrude 50 μm to 100 μm in length.

The birefringence values of the discs molded with the above-mentioned mold were ±10 nm as measured with a double-pass measuring method.

Application Heisei 5-24332 does not disclose any special method of using the prior-art mold with two protruding parts (i.e. gate insert bushing and the inner stamper retainer).

Today there is a demand for digital discs capable of storing much more information, in the discs of the same diameter as a compact disc (120 mm). It is required that discs for DVD be made thinner than CD discs and also that the birefringence of the molded DVD discs be within ±10 nm as measured with a single-pass measuring method, so as to improve the optical quality of the molded DVD discs, on which it is necessary to read much more clearly by laser beams the stored information on the molded discs.

The discs for DVD are 0.6 mm in thickness. As the disc for DVD is thin, it is required that the molded DVD disc be duplicated by laminating. Therefore, one side of the disc for DVD has to be molded so as to maintain a flat surface (except for minute concavities or pits) for laminating. With the mold of the Japanese opened utility patent Application Heisei 5-24332, each protruding portion of the gate insert bushing and the inner stamper retainer on the surface of the stationary mirror plate and on the movable mirror plate respectively, so a concavity appears at the respective central portions of both sides of the molded discs. Such discs are unsuitable for DVD discs.

Moreover, it is important, when opening the mold, for the molded discs to be released rapidly and smoothly from the surface of the mirror plate and stamper without cloud or stain marks appearing on the molded discs. However, the projecting portions of the gate insert bushing or the inner stamper retainer often prevent fluent flow of blowing air when releasing the molded discs with air blowing.

SUMMARY OF THE INVENTION

The present invention has been created in view of the above-identified problem.

It is an object of the invention to provide a novel mold for molding discs for DVD use, each of which is composed of two thin discs duplicated by laminating.

Another object of the present invention is to provide a novel mold for molding discs for DVD use, in which a side surface is flat for laminating.

A further object of the invention is to provide a novel mold for molding discs for DVD use with a low value of birefringence.

Still a further object of the invention is to provide a novel mold for molding discs for DVD use capable of releasing discs rapidly and smoothly from the surface of the mirror plate when opening the mold.

A different object is to provide a method of using the mold of the invention.

BRIEF DESCRIPTION OF THE DRAWING

The above and other objects, and the nature and advantages of the present invention, will become more apparent from the following detailed description of embodiments taken in conjunction with the drawing, wherein.

DETAILED DESCRIPTION OF THE PREFERRED EMBODIMENT

This invention will be described in further detail by way of three exemplary embodiments with reference to the accompanying drawings.

Figure 1:
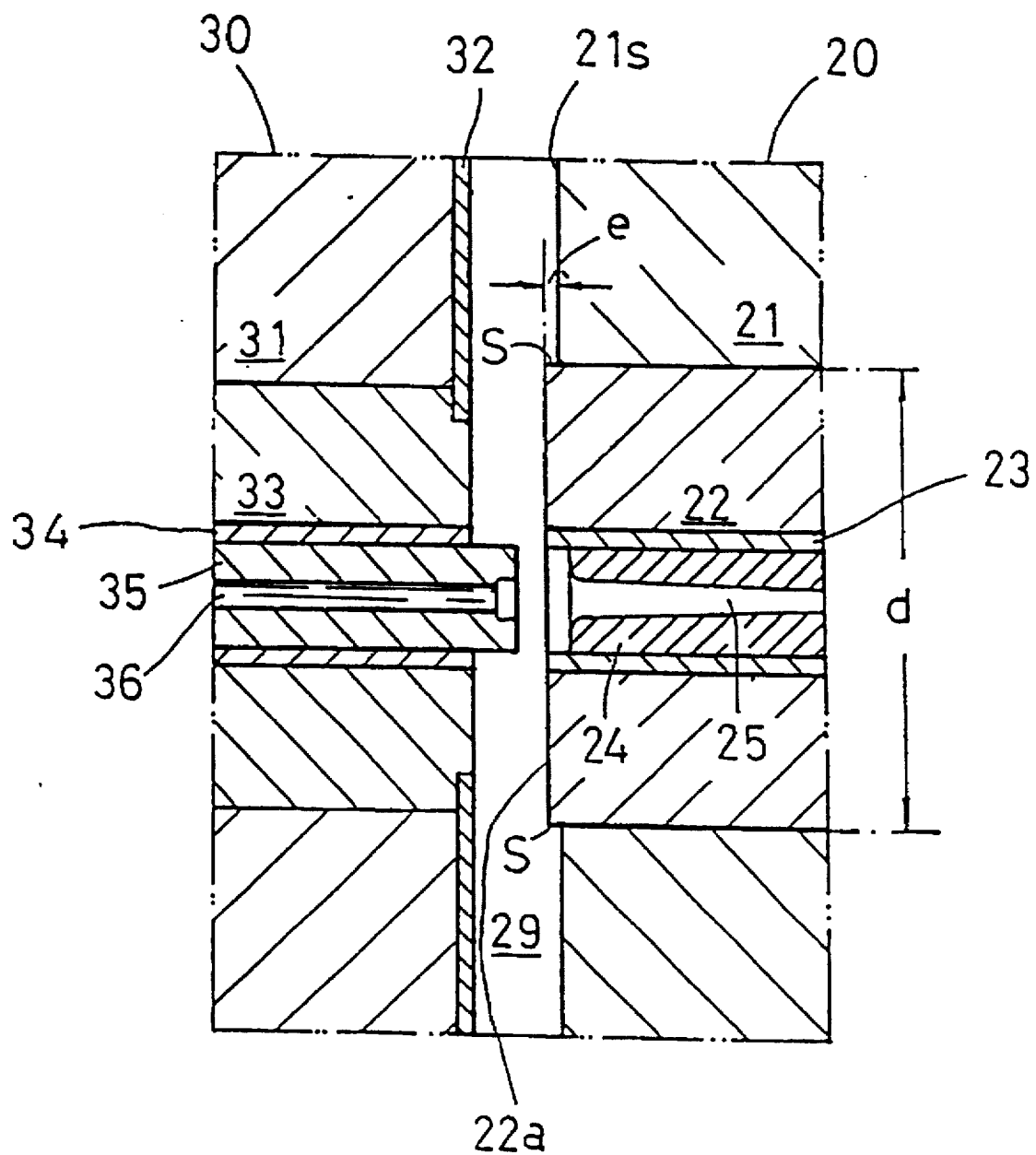
FIG. 1 is an enlarged fragmentary elevation and cross-section of the mold of the invention, wherein a stamper is mounted on the mirror plate of a movable moldhalf.

FIG. 1 shows a cross-sectionally fragmentary elevation of a stationary moldhalf 20 and a movable moldhalf 30 which are used in a mold for molding DVD substrata, wherein a stamper is mounted in the side of the movable moldhalf 30.

A stationary mirror plate 21 with a mirror surface 21s is provided for forming a wall of a cavity 29 in the stationary moldhalf 20. A stationary inserting block 22 is fixedly inserted into a central hole of the stationary mirror plate 21. A female cutter 23 is fixedly inserted into the central hole of the stationary inserting block 22, into which a sprue bushing 24, with a sprue hole 25, is inserted.

The stationary inserting block 22 and the female cutter 23 are assembled together so that each tip surface (22a) thereof is arranged to be fitted in a same plane, of which each tip portion protrudes from the surface of the stationary mirror plate 21 into the cavity 29.

The means which directly inserts the sprue bushing 24 into the central hole of the stationary inserting block 22 without the female cutter 23 is included in another embodiment of the invention.

In the invention, the diameter (d) of the inserting block 22 of the protruding portion is preferably in the range of 20 mm to 43 mm and the protruding length (e) from the mirror surface 21s is preferably in the range of 10 μm to 70 μm, and the diameter and thickness of the cavity 29 are respectively 120 mm and 0.6 mm.

Figure 5:
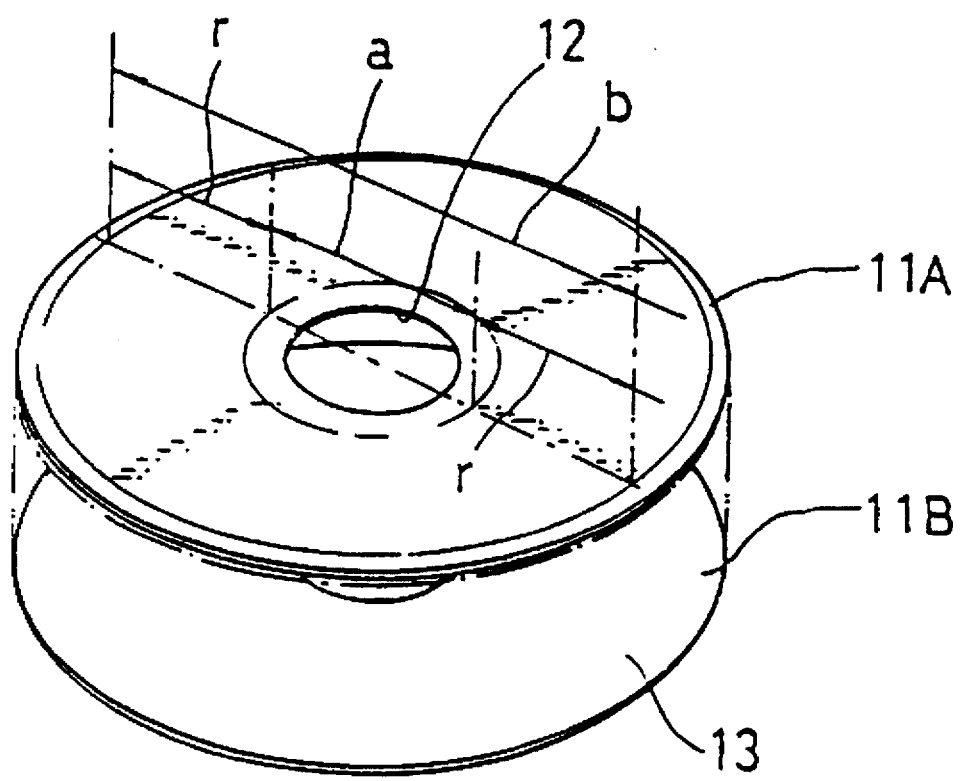
FIG. 5 is a perspective illustration of duplicate discs for DVD.

As a pictorial perspective view of a disc for DVD laminated from two discs is shown in FIG. 5. The disc for DVD 10 consists of two molded disc substrata 11A and 11B which are laminated on each information surface 13 thereof. In the molded disc substrata 11A and 11B with 120 mm diameter, the information area (r) is in the range of 43 mm (a) to 113 mm (b) in diameter. The area (a) which is not the information area (r) relates to determining the range of the above-described diameter (d) of the protruding portion.

A movable mirror plate 31 is provided with the movable moldhalf 30. A movable inner stamper retainer 33 is inserted into the central hole of the movable mirror plate 31.

A stamper 32 is retained along an inner periphery thereof by the vacuum force due to air suction from an air suction groove 33a provided between an outer periphery of the movable inner stamper retainer 33 and an inner periphery of the central portion of the movable mirror plate 31, which is retained along an outer periphery thereof (not shown). The width of the air suction groove 33a is about 40 μm.

An ejector sleeve 34 is inserted into the central hole of the movable inner stamper retainer 33. It is capable of reciprocating for ejecting the molded discs. A male cutter 35 is inserted into the ejector sleeve 34; it is capable of reciprocating for forming a center hole of the disc. An ejector pin 36 is inserted into the male cutter 35. It is capable of reciprocating for ejecting molded sprues.

Figure 2:
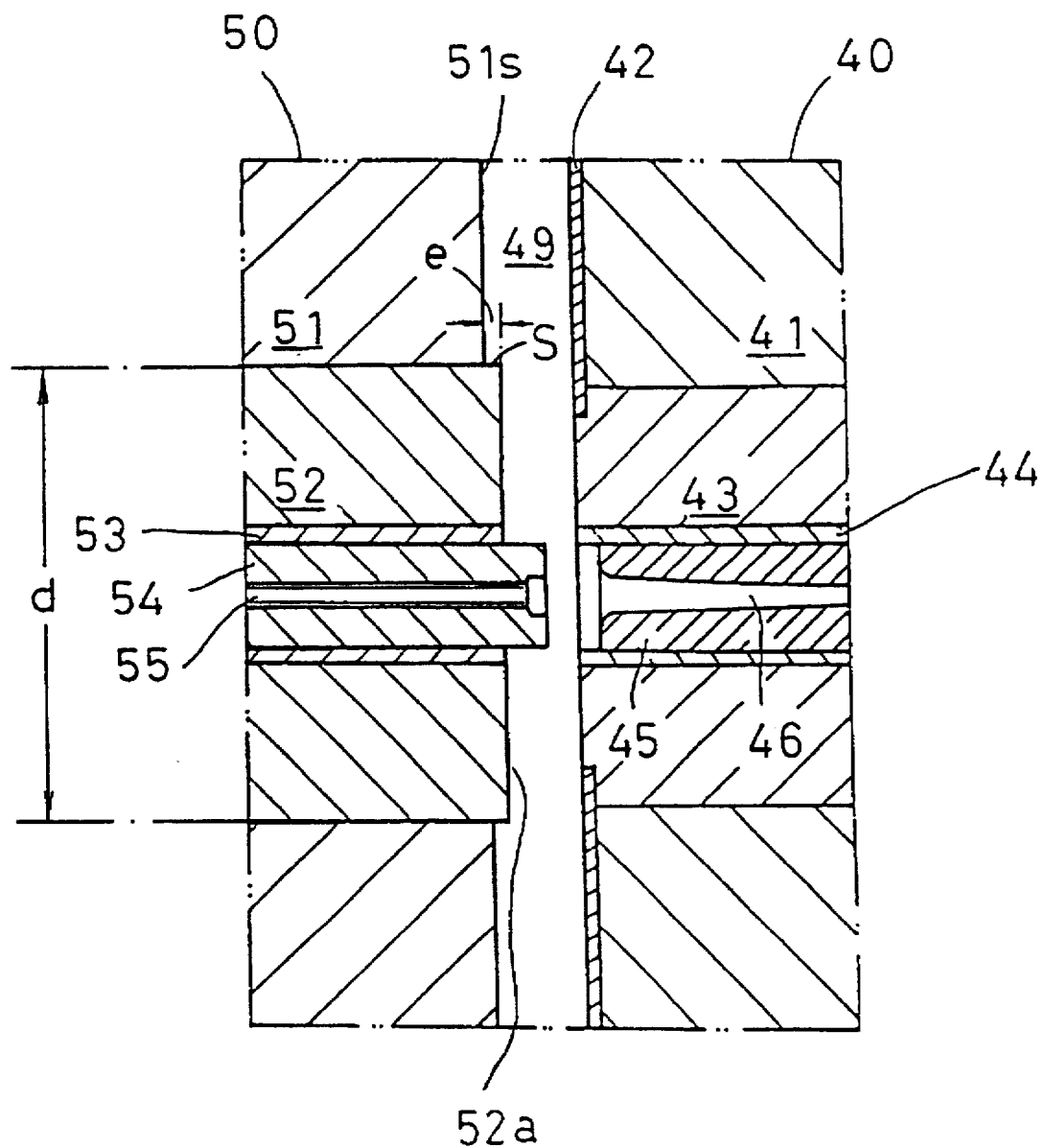
FIG. 2 is an enlarged fragmentary elevation and cross-section of the mold of the invention, wherein a stamper is mounted on the mirror plate of a stationary moldhalf.

FIG. 2 shows a cross-sectionally fragmentary elevation of a stationary moldhalf 40 and a movable moldhalf 50 which are used in a mold for molding DVD substrata, wherein a stamper is provided on the side of the stationary moldhalf 40.

A stationary mirror plate 41 is provided with the stationary moldhalf 40. A stationary inner stamper retainer 43 is inserted into the central hole of the stationary mirror plate 41. A stamper 42 is retained along an inner periphery thereof by the vacuum force due to air suction from an air suction groove 43a provided between an outer periphery of the stationary inner stamper retainer 43 and an inner periphery of the central portion of the stationary mirror plate 41, in which is retained along an outer periphery thereof (not shown). The width of the air suction groove 43a is about 40 μm.

A female cutter 44 is fixedly inserted into the central hole of the stationary inner stamper retainer 43, in which a sprue bushing 45 with a sprue hole 46 is inserted.

The means which directly inserts the sprue bushing 45 into the central hole of the stationary inner stamper retainer 43 without the female cutter 44 is included in another embodiment of the invention.

The stationary inner stamper retainer 43 and the female cutter 44 are assembled together so that each tip surface thereof is arranged to be fitted in a same plane with the surface of the stamper 42.

A movable mirror plate 51 with a mirror surface 51s is provided for forming a wall of a cavity 49 in the movable moldhalf 50. A movable inserting block 52 is fixedly inserted into a central hole of the movable mirror plate 51.

A male cutter 54 is inserted into the ejector sleeve 53 and is capable of reciprocating for forming a center hole of the disc, into which an ejector pin 55 is inserted that is capable of reciprocating for ejecting of molded sprues.

The tip surface 52a of the movable inserting block 52 slightly protrudes from the surface 51s of the movable mirror plate 51 into the cavity 49.

In the invention, the diameter (d) of the protruding portion of the movable mirror plate 51 is preferred to be in the range of 20 mm to 43 mm and the protruding (e) from the mirror surface 51s is preferred in the range of 10 μm to 70 μm. The diameter and thickness of the cavity 49 are respectively 120 mm and 0.6 mm.

Figure 3:
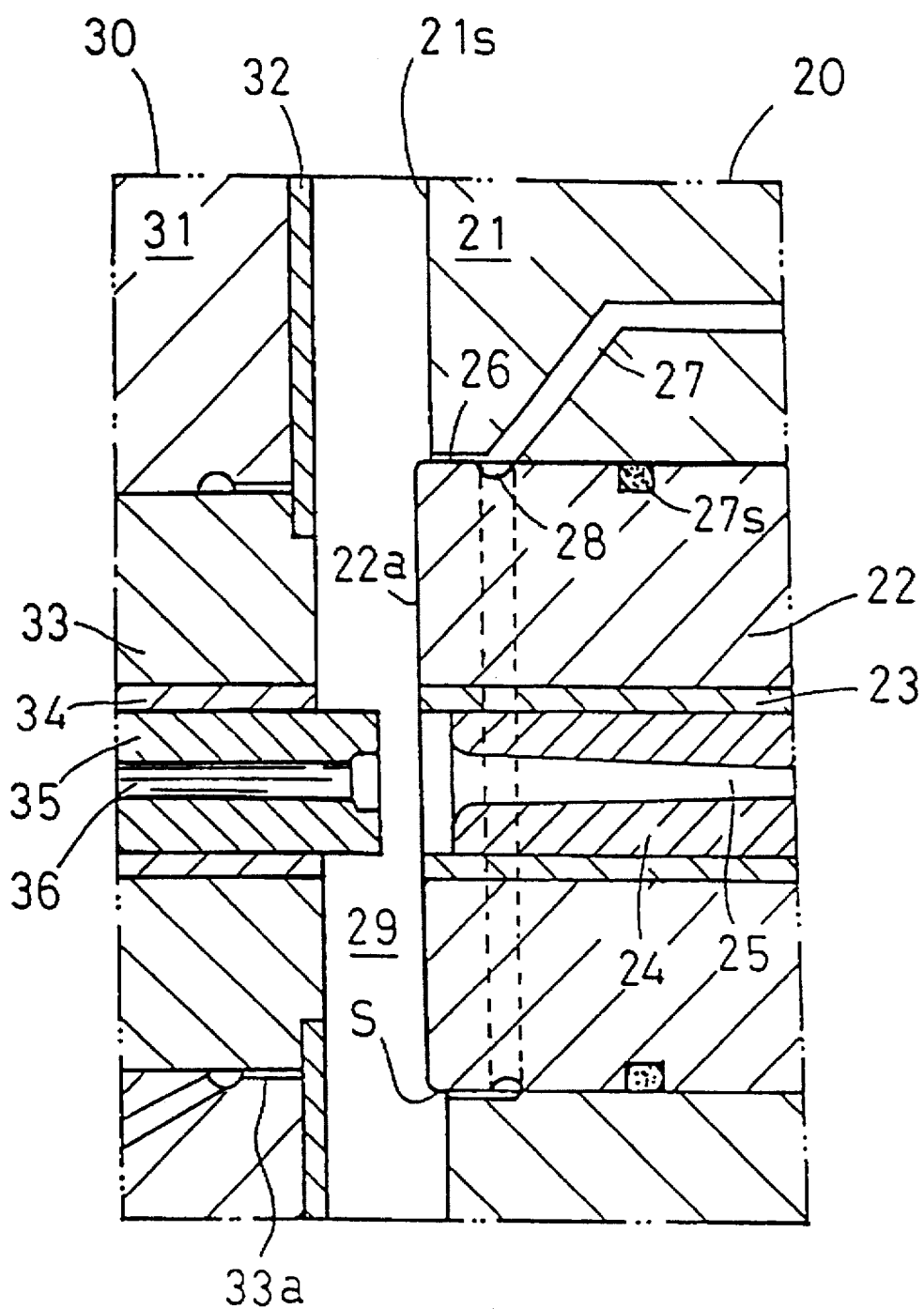
FIG. 3 is an enlarged fragmentary elevation and cross-section of the mold of the invention, wherein a stamper is mounted on the mirror plate of a movable moldhalf and an air passage for air blowing is provided in the side of the movable moldhalf.

FIG. 3 shows a cross-sectionally fragmentary elevation of a stationary moldhalf 20 and a movable moldhalf 30 which are used in a mold for molding DVD substrata, wherein a stamper is provided on the side of the movable moldhalf 30 as shown in FIG. 1 and wherein a means for releasing the molded discs from the stationary cavity surface is provided with the stationary moldhalf 20.

The means for releasing the molded discs includes an annular outlet 26 which is provided along an inner peripheral surface of the hole of the stationary mirror plate 21 to be capable of blowing air into the cavity 29 through an annular groove 28 provided on the outer peripheral surface of the stationary inserting block 22 from at least one air passage 27 provided with the stationary mirror plate 21. The width of the annular outlet 26 is about 15 μm. An O ring packing 27s is provided between the outer periphery of the stationary inserting block 22 and the central hole of the stationary mirror plate 21 to prevent back flow of the blown air.

Figure 4:
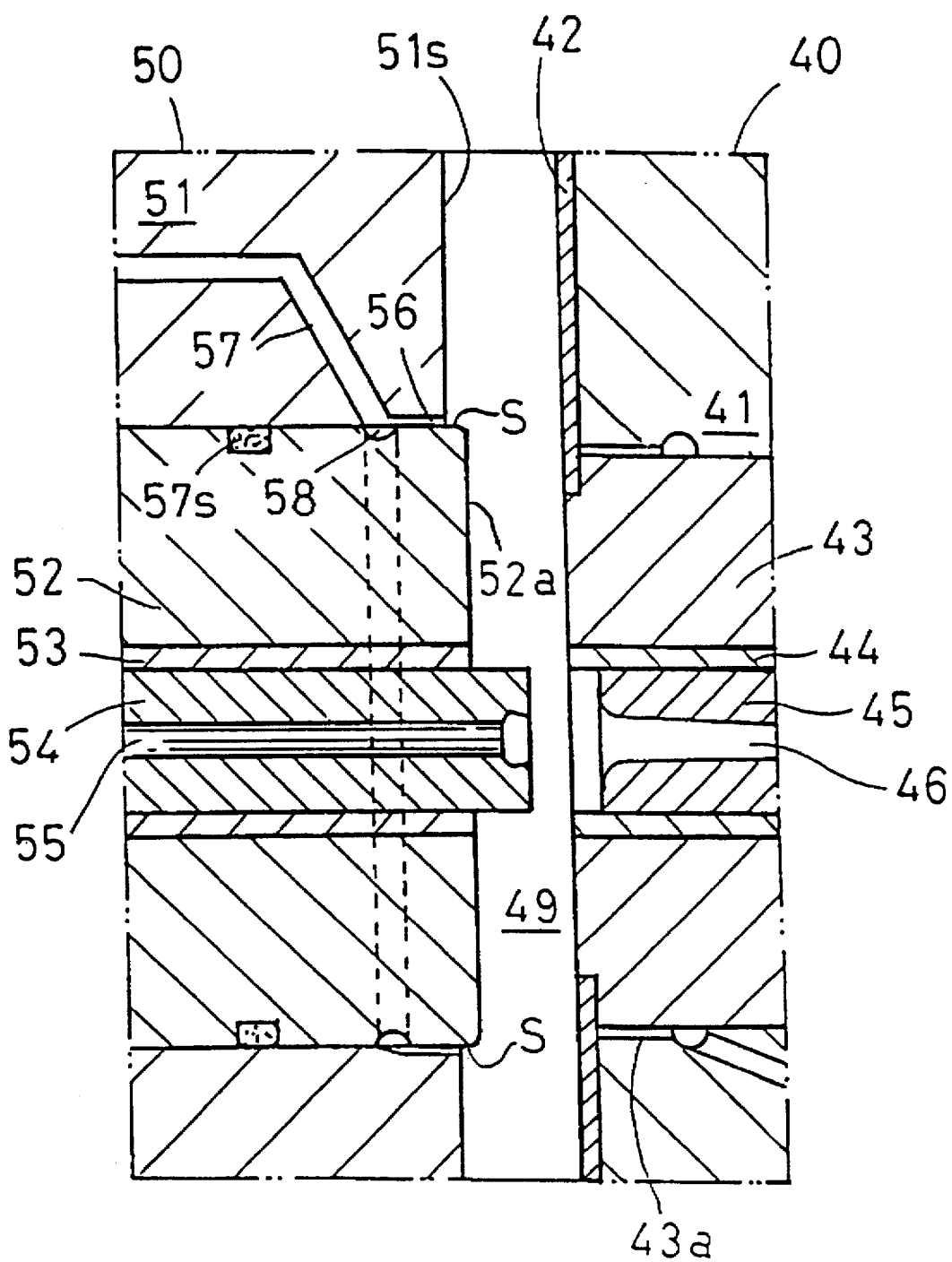
FIG. 4 is an enlarged fragmentary elevation and cross-section of the mold of the invention in which a stamper is mounted on the mirror plate of a stationary moldhalf and an air passage for air blowing is provided in the side of the stationary moldhalf.

FIG. 4 shows a cross-sectionally fragmentary elevation of a stationary moldhalf 40 and a movable moldhalf 50 which are used in a mold for molding DVD substrata, wherein a stamper is provided on the side of the stationary moldhalf 40 as shown in FIG. 2 and wherein a means for releasing the molded discs from the movable cavity surface is provided with the movable moldhalf 50.

The means for releasing the molded discs includes an annular outlet 56 which is provided along an inner peripheral surface of the hole of the movable mirror plate 51. It is for blowing air into the cavity 49, from an annular groove 58 provided in the outer peripheral surface of the movable inserting block 52, fed from at least one air passage 57 provided in the movable mirror plate 51. The width of the outlet annular groove 26 is about 15 μm in length. An O ring packing 57s is provided between the outer periphery of the movable inserting block 52 and the central hole of the movable mirror plate 51 to prevent back flow of the blown air.

In operation, after the mold is closed by advancing the movable moldhalf 30 (50), melted resin of a predetermined quantity is injected into the cavity 29 (49) through the sprue hole 25 (46) of the sprue busing 24 (45). The melted resin spouts from the sprue hole 25 (46). While the resin is spreading from the sprue hole into the cavity 29 (49) the mold is slightly opened; the moment an injection force for the melted resin acting on the cavity surface exceeds the clamping force of the mold, then the mold opens a bit. As soon as the injection of the melted resin is finished, the mold is closed to compress the injected resin under a uniform pressure. While the injected resin has not yet cooled, the male cutter 35 (54) is projected until the tip portion thereof is slightly inserted into the hole of female cutter 23 (44) to form the central aperture 12 of the molded discs. After cooling of the molded discs has finished, the mold is opened for the molded discs to be released by the air blowing from the annular outlet 26 (56) and for ejecting by the ejecting sleeve 34 (53). Simultaneously, the molded sprue is released by the ejecting motion of the ejector pin 36 (55).

In the mold of the present invention, the tip surface 22a of the stationary inserting block 22 (or the movable inserting block 52) protrudes from the surface 21s of the stationary mirror plate 21 (or the movable mirror plate 51) by a length (e) to make the thickness of the cavity 29 (or 49) narrow in the cavity area of having the diameter d. When injected resin is spread in the diameter d area of the cavity, the injected resin flows under a high sharing stress; once past the diameter d area border the injected resin spreads into a thicker cavity portion and is released from the high sharing stress. Subsequently, before the injected resin completely fills the cavity, the mold is opened slightly by the above-described injection force, then to be closed again, so as to compress the injected resin under a uniform pressure. When the injected resin is thus compressed, the resin filled in the diameter d area prevents the back flow of the resin filled in the outer area, outside the diameter d border, where the information area of the molded discs is formed. Consequently, the resin filled in the information area outside the diameter d is able to form clear pits with less strain; and these are the information sources of the discs.

Figure 6:
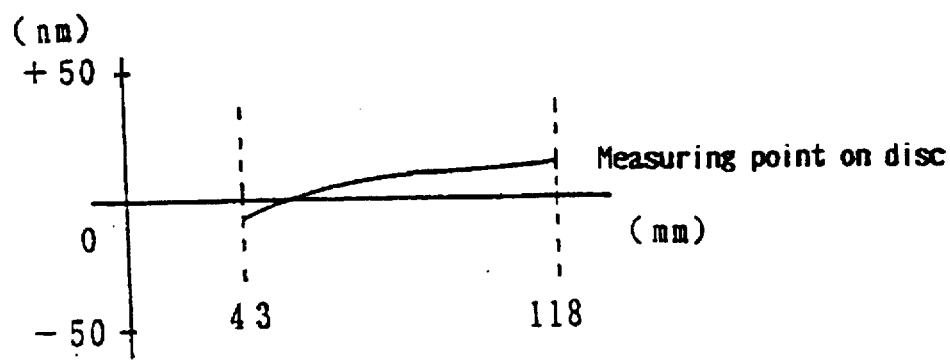
FIG. 6 is a graph showing the value of birefringence of the discs molded by the invention.
Figure 7:
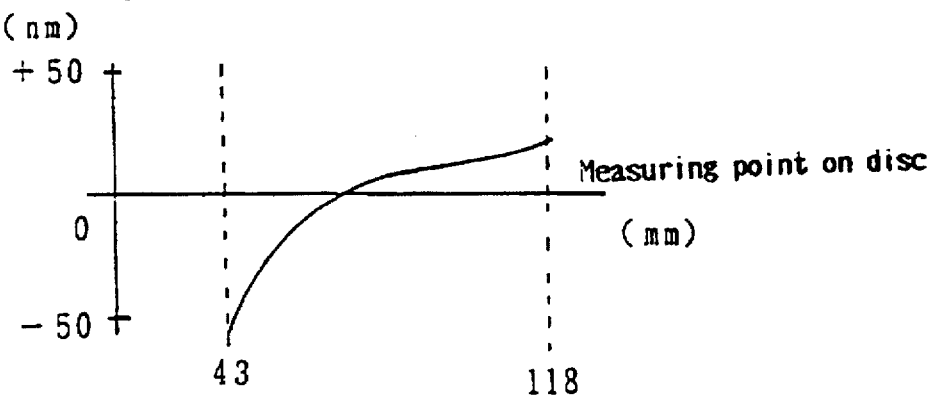
FIG. 7 is a graph showing the value of birefringence of discs molded by the prior-art mold with neither the tip portion of the gate insert bushing nor the tip portion of the inner stamper retainer protruding above the mirror plates.

The relation between the value of birefringence and a measuring point (radial distance from the center) on the discs molded by the mold of the invention is shown in FIG. 6, and the relation between the value of birefringence and a measuring point of the discs molded by the mold of the prior art is shown in FIG. 7. The measured discs were 120 mm in diameter and 0.6 mm in thickness, and the values of birefringence were measured by a single pass method.

The birefringence values of the discs molded by the mold of the invention are in the range of ±10 nm as shown in FIG. 6, while those of the discs molded by the prior art mold are in the range ±50 nm as shown in FIG. 7.

When the injected resin is cooled in the mold of the present invention, injected resin sticks on the side surface S along the protruding portion of the stationary inserting block (the movable inserting block) due to shrinkage of the resin. However, because an annular outlet 26 (56) is provided along an inner peripheral surface of the hole of the stationary mirror plate 21 (or the movable mirror plate 51), it is possible to release the molded discs from the surface of the mirror plate with sufficient volume of blowing air without stain marks or cloud appearing on the molded discs. In the invention, although the blowing air flows sufficiently toward the outside from the protruding portion of the stationary inserting block 22 (the movable insertion block 52), due to the position of the annular outlet 26 (56) the blowing air does not flow sufficiently inward on the surface of the protruding portion of the block 22 (52). However, the surface of this portion is not an information area of the molded discs, so it is allowable to grind the surface of this part of the mold to a roughness of about 0.1 S or to finish it with a TiN coating to facilitate the releasing of the discs from this portion of the surface. Moreover, it facilitates the release of the molded discs if a round edge of radius (about 0.05 mm) is formed at each tip corner of the stationary inserting block 22 and the movable inserting block 52.

The present invention also contemplates an injection-compression method of using the above-described mold, which allows the mold to achieve better birefringence results.

The mold of the invention includes two relatively-movable moldhalves; whether one stationary moldhalf moves, or both moldhalves move, is immaterial to the invention, as long as the two moldhalves are relatively movable along the mold axis (not shown in the drawing, but inherent in the symmetry). As described above, the moldhalves define a molding cavity with a central sprue hole 25 for injection of resin. The cavity is bounded by portions of the mold, including a disc-shaped central area defined generally by the surfaces of the stamper retainer 33 or 43 and the facing surface of the inserting block 22 or 52 (having diameter d) and a surrounding annular space bounded by the two facing annular mirror surfaces, e.g., 21s in FIG. 1. All of the surfaces are generally coaxial with the mold axis and perpendicular to the mold axis.

In all of the above-described embodiments one of the first central surface and the second central surface is disposed along the mold axis by the protruding length e, and extends into the cavity past the adjacent respective annular mirror surface.

The mold must include means for opening the mold to remove the discs, and also a means for exerting an axial force between the two moldhalves. The axial force is needed to prevent the mold from springing open when resin is injected under high pressure (250–300 kg/cm², or more than 3500 psi).

The mold cavity has a projected total surface area perpendicular to the mold axis, equal to the disc-shaped area. In the preferred embodiment for producing discs of radius 120 mm, the total force exerted on the mold by the resin is between 28,000 and 34,000 kg or more than 60,000 lbf (30 tons).

Figure 9:
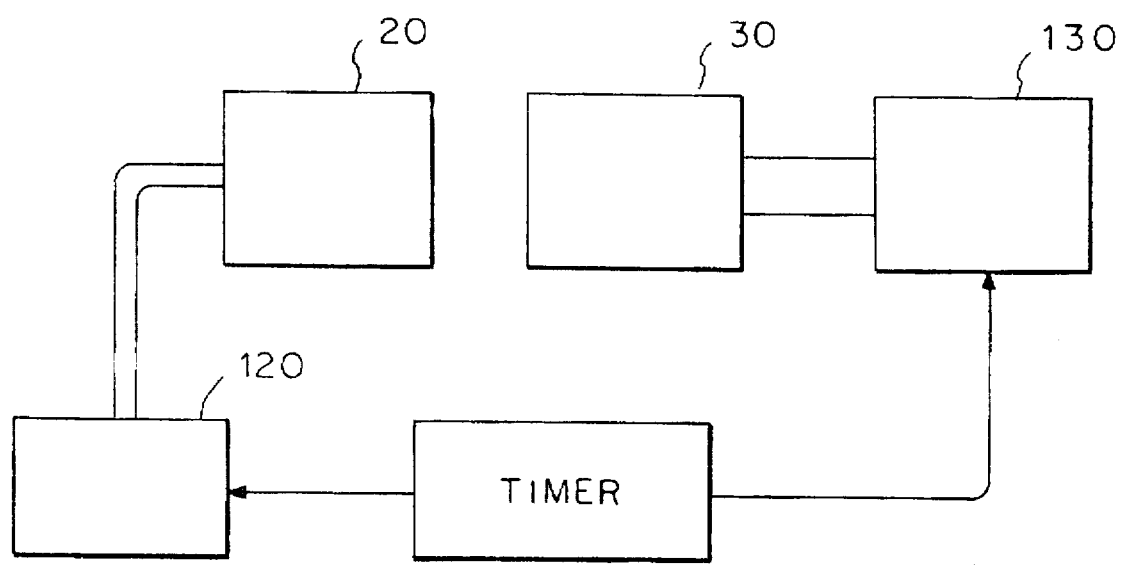
FIG. 9 is a schematic view showing a means for compressing the mold with variable force.

Such a large outward force must be counteracted by the mold's apparatus that exerts the axial compression force. Such an apparatus must exert very high force but also be movable; an hydraulic cylinder is one example of such an apparatus. FIG. 9 shows, schematically, an hydraulic cylinder 130, for exerting a variable force on the movable moldhalf 30, coupled to a timer; and an injector 120 also coupled to the timer.

In the present invention the apparatus which exerts axial forces to compress the two moldhalves together is capable of exerting different magnitudes of compression. In the first stage of injection, the axial force is held to a lower magnitude. This first axial force is less than the product of the injection pressure and the total surface area; that is, the injected resin exerts a greater force than the compression apparatus, so that the mold springs slightly open. The compression apparatus is designed such that the spacing between the moldhalves is increased only slightly, and the amount of resin injected is not excessive. The resin batch inside the mold cavity is at this stage of the process slightly thicker than the finished disc will be.

Figure 8:
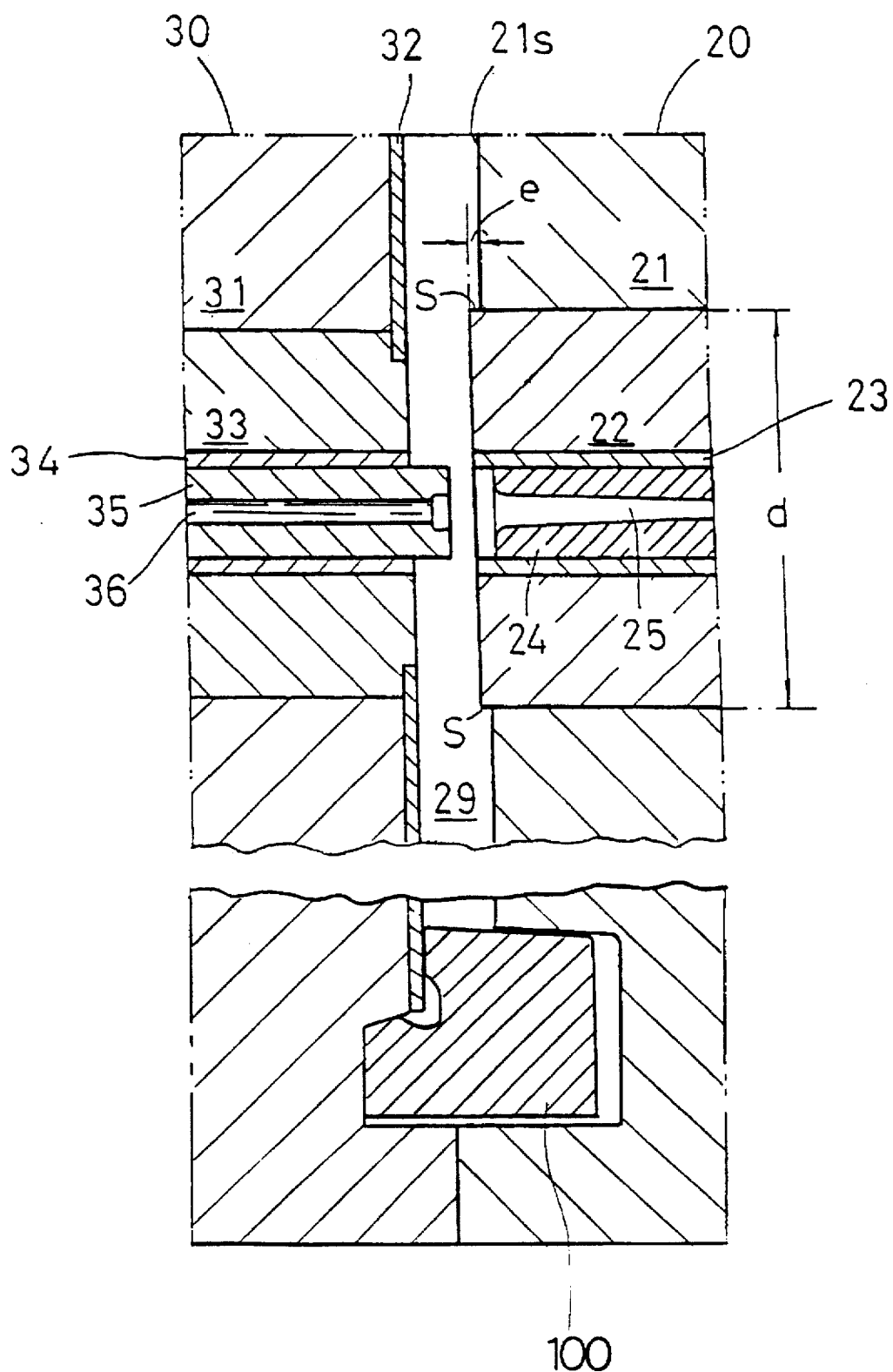
FIG. 8 is like FIG. 1 but shows a seal for resin sealing when the two moldhalves move apart slightly.

The mold of the invention preferably includes seals at the outer disc diameter (e.g., 120 mm) which allow the two moldhalves to separate slightly without resin leaking from the outer circumference. FIG. 8 (which otherwise duplicates FIG. 1) shows an encircling member 100 which has only a small gap (15 μm) between it and the moldhalves; this allows gas to pass buts seals the higher-viscosity resin. Such a seal is shown in Heisei 5-24332. Other sealing arrangements are also within the scope of the invention.

After the resin is injected, the compressing axial force is increased to a high value, e.g., 30 tons or more. This forces the mold closed, and it appears that at least some of the resin reverses direction, flowing inwardly toward the sprue hole 25. The backflow is restricted by the narrower central gap in the disc-shaped space, caused by the central surface of diameter d which protrudes the length e into the cavity.

If the initial compressing force is sufficiently low, the resin will begin to push back the moldhalves when the batch is still smaller in diameter than the finished disc, i.e., before the resin reaches the outer circumference (e.g., 120 mm). In this case the resin should flow both radially outward and radially inward when the compressive force is increased.

In order to prevent the resin pressure from opening the mold excessively, the compression apparatus can be resilient (though with a high spring constant), either through mechanical design or by hydraulic fluid control; or the timing of the injection and the stepped-up force may be such that the inertia of the movable moldhalf significantly contributes to limiting the opening of the mold. Also, the apparatus may be non-resilient but include means for positively displacing the movable moldhalf by a predetermined distance in particular stages of the injection process, and the required forces be generated as needed to achieve the predetermined positions.

It appears that the value of birefringence in the discs produced by the method of the invention is lower than that of prior-art discs because the backflow, after compression force is increased, comes after the resin has been in contact with the mold and is slightly cooler than it is when first injected. In the narrower central space the resistance is thus higher during backflow. The backflow displacement of the resin is therefore expected to be less than the displacement during the initial injection flow, and the backflow might also relieve some shearing stresses in the resin set up during the initial forward flow. Since birefringence is related to shear stress, this might be a factor in the improvement realized by the present invention. However, compressive stress also contributes to birefringence; it is believed that the compressive stress and the shear stresses might partially cancel. The exact physics behind the improvement made by the invention has not yet been exactly determined.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed:

1. A mold for molding discs to be laminated into composite discs, the mold having a cavity and comprising:
   (a) a stationary moldhalf including
      a stationary mirror plate, said stationary mirror plate having a central first hole;
      a stationary inserting block having a central second hole, said inserting block being fixedly inserted into the first hole of the stationary mirror plate and including an end tip surface protruding a protruding length e beyond a stationary mirror plate surface of the stationary mirror plate;
      a sprue bushing having a sprue hole and being fixedly inserted into the second hole of the stationary inserting block;
   (b) a movable moldhalf including
      a movable mirror plate having a central third hole;
      a stamper having a center aperture and mounted on the movable mirror plate;
      a movable inner stamper retainer having a central fourth hole therethrough and being inserted into the third hole of the movable mirror plate for retaining the stamper along an inner stamper periphery thereof;
      an ejector sleeve inserted into the central fourth hole of the movable inner stamper retainer;
      a mechanism for ejecting molded discs, including a mechanism for reciprocating said ejector sleeve within the central fourth hole;
      a male cutter slidably inserted into an inner ejector sleeve periphery of the ejector sleeve;
      a device for forming a central aperture of the molded discs, said device for forming a central aperture including a mechanism for reciprocating the male cutter within the ejector sleeve;
      a device for exerting a first axial force;
      a mechanism for injecting hot resin into the cavity via the sprue hole under an injection pressure, a product of the injection pressure and the total surface area being greater than the first axial force, such that a separation distance of the moldhalves is slightly increased; and
      a device for exerting a larger second axial force on the mold with the compression means, the second axial force being greater than the product of the injection pressure and the total surface area, such that the separation distance of the moldhalves is slightly decreased.

2. A mold for molding discs to be laminated into composite discs, the mold having a cavity and comprising:
   (a) a stationary moldhalf including
      a stationary mirror plate having a central third hole;
      a stamper having a center aperture and mounted on the stationary mirror plate;
      a stationary inner stamper retainer having a central fourth hole therethrough and being inserted into the third hole of the stationary mirror plate for retaining the stamper along an inner stamper periphery thereof;
      a sprue bushing having a sprue hole and being fixedly inserted into the fourth hole of the stationary inner stamper retainer;

(b) a movable moldhalf including
  a movable mirror plate having a central first hole;
  a movable inserting block having a central second hole, said inserting block being fixedly inserted into the first hole of the movable mirror plate and including an end tip surface protruding a protruding length e beyond a movable mirror plate surface of the movable mirror plate;
  an ejector sleeve inserted into the central fourth hole of the stationary inner stamper retainer;
  a mechanism for ejecting molded discs, including a mechanism for reciprocating said ejector sleeve within the central fourth hole;
  a male cutter slidably inserted into an inner periphery of the ejector sleeve;
  a device for forming a central aperture of the molded discs, said device for forming a central aperture including a mechanism for reciprocating the male cutter within the ejector sleeve;
  a device for exerting a first axial force;
  a mechanism for injecting hot resin into the cavity via the sprue hole under an injection pressure, a product of the injection pressure and the total surface area being greater than the first axial force, such that a separation distance of the moldhalves is slightly increased; and
  a device for exerting a larger second axial force on the mold with the compression means, the second axial force being greater than the product of the injection pressure and the total surface area, such that the separation distance of the moldhalves is slightly decreased.

3. The mold according to claim 1 wherein the stationary moldhalf comprises
  an annular outlet disposed along an inner central first hole periphery of the central first hole for blowing air into the cavity for released of the discs.

4. The mold according to claim 2 wherein the movable moldhalf comprises
  an annular outlet disposed along an inner central first hole periphery of the central first hole for blowing air into the cavity for released of the discs.

5. The mold according to claim 1 wherein the sprue bushing comprises:
  a female cutter fixedly inserted into the second hole of the stationary inserting block and having a female cutter end surface; and
  an inner sprue bushing portion fixedly inserted into the female cutter; wherein
    the female cutter and the inner sprue bushing portion are assembled together with the stationary inserting block such that the female cutter end surface of the female cutter is even with the end tip surface of the stationary inserting block,
    whereby both the end tip surface and the female cutter end surface protrude equally from the stationary mirror plate surface by the protruding length e.

6. The mold according to claim 2 wherein the sprue bushing comprises:
  a female cutter fixedly inserted into the fourth hole of the stationary inner stamper retainer and having a female cutter end surface; and
  an inner sprue bushing portion fixedly inserted into the female cutter; wherein
    the female cutter and the inner sprue bushing portion are assembled together with the stationary inner stamper retainer such that the female cutter end surface of the female cutter is even with the end tip surface of the stationary inner stamper retainer,
    whereby both the end tip surface and the female cutter end surface protrude equally from the stationary mirror plate surface the protruding length e.

7. The mold according to claim 1, wherein:
  the cavity has a cavity diameter of 120 mm and a cavity thickness of 0.6 mm;
  the protruding length e is within the range of 10 μm to 70 μm; and
  a diameter d of the stationary inserting block is within the range of 20 mm to 43 mm.

8. The mold according to claim 2, wherein:
  the cavity has a cavity diameter of 120 mm and a cavity thickness of 0.6 mm;
  the protruding length e is within the range of 10 μm to 70 μm; and
  a diameter d of the movable inserting block is within the range of 20 mm to 43 mm.

9. A mold for molding discs having a birefringence, the mold comprising:
  (a) two moldhalves relatively movable along a mold axis;
  (b) a cavity, the cavity including a total surface area perpendicular to the mold axis and being defined by bounding portions of the mold, the bounding portions including
    (1) a generally annular and plane first mirror surface and a generally annular and plane second mirror surface facing thereto, the first mirror surface and the second mirror surface being generally coaxial with the mold axis and perpendicular to the mold axis to define therebetween an annular space,
    (2) a generally disc-shaped and plane first central surface and a generally disc-shaped and plane second central surface facing thereto, the first central surface and the second central surface being generally coaxial with the mold axis and perpendicular to the mold axis to define therebetween a disc space, wherein
    (3) a single one of the first central surface and the second central surface being disposed along the mold axis a protruding length e into the cavity past respectively the first mirror surface and the second mirror surface;
  (b) a central sprue hole for injecting hot resin into the cavity, the sprue hole being adjacent the mold axis;
  (c) means for injecting hot resin into the cavity via the sprue hole under an injection pressure; and
  (d) compression means for exerting axial forces along the hold axis to press the moldhalves together, the axial forces including
    a first axial force less than a product of the injection pressure and the total surface area, and
    a second axial force being greater than the product of the injection pressure and the total surface area.

10. The mold according to claim 9:
  wherein the compression means includes means for increasing a separation distance of the moldhalves; and including
    moldhalf sealing means for preventing resin from escaping from a circumference of the cavity when the separation distance is increased.

11. The mold according to claim 1, wherein the device for exerting a first axial force and the device for exerting a second axial force together comprise an hydraulic cylinder coupled to a timer.

12. The mold according to claim 2, wherein the device for exerting a first axial force and the device for exerting a second axial force together comprise an hydraulic cylinder coupled to a timer.

* * * * *